US006935180B2

(12) United States Patent
Weisbrodt

(10) Patent No.: US 6,935,180 B2
(45) Date of Patent: Aug. 30, 2005

(54) SENSOR DIAPHRAGM

(75) Inventor: Rainer Weisbrodt, Ilvesheim (DE)

(73) Assignee: Prominent Dosiertechnik GmbH (DE)

( * ) Notice: Subject to any disclaimer, the term of this patent is extended or adjusted under 35 U.S.C. 154(b) by 0 days.

(21) Appl. No.: 10/848,807

(22) Filed: May 19, 2004

(65) Prior Publication Data

US 2004/0261536 A1 Dec. 30, 2004

(30) Foreign Application Priority Data

May 20, 2003 (DE) ........................................ 103 23 059

(51) Int. Cl.[7] ................................................ G01L 7/08
(52) U.S. Cl. ........................................................ 73/715
(58) Field of Search ........................... 73/715–727, 706, 73/756; 361/283.1, 283.2, 283.3, 283.4

(56) References Cited

U.S. PATENT DOCUMENTS

| | | | | |
|---|---|---|---|---|
| 4,177,680 A | * | 12/1979 | Coleman | 73/718 |
| 4,569,634 A | | 2/1986 | Mantell | |
| 4,781,535 A | | 11/1988 | Frawley et al. | |
| 5,920,015 A | * | 7/1999 | Hallberg et al. | 73/724 |
| 6,725,725 B1 | * | 4/2004 | Werner et al. | 73/716 |

FOREIGN PATENT DOCUMENTS

| | | | |
|---|---|---|---|
| DE | 19829084 | A1 | 1/2000 |
| EP | 0715690 | B1 | 1/1996 |
| EP | 0732501 | B1 | 3/1996 |
| WO | WO 95/27194 | | 2/1995 |

* cited by examiner

*Primary Examiner*—William Oen
(74) *Attorney, Agent, or Firm*—Michael L. Dunn

(57) ABSTRACT

The present invention concerns a sensor diaphragm comprising a plurality of diaphragm layers which are arranged in sandwich-like mutually superposed relationship and which include a conveyor or separating diaphragm (1), a first electrically conductive diaphragm layer (2) arranged therebeneath, an electrically insulating diaphragm layer (3) arranged therebeneath and a second electrically conductive diaphragm layer (4) arranged therebeneath, wherein the first and second conductive diaphragm layers (2, 4) are separated from each other and electrically insulated by the electrically insulating diaphragm layer (3) and the second electrically conductive diaphragm layer (4) has portions (7) which engage through openings (5) in the electrically insulating diaphragm layer (3) and through openings (6) in the first electrically conductive diaphragm layer (2) and the electrically insulating diaphragm layer (3) has portions (12) which engage through the openings (5) in the first conductive diaphragm layer.

29 Claims, 2 Drawing Sheets

SENSOR DIAPHRAGM

Figure 1:
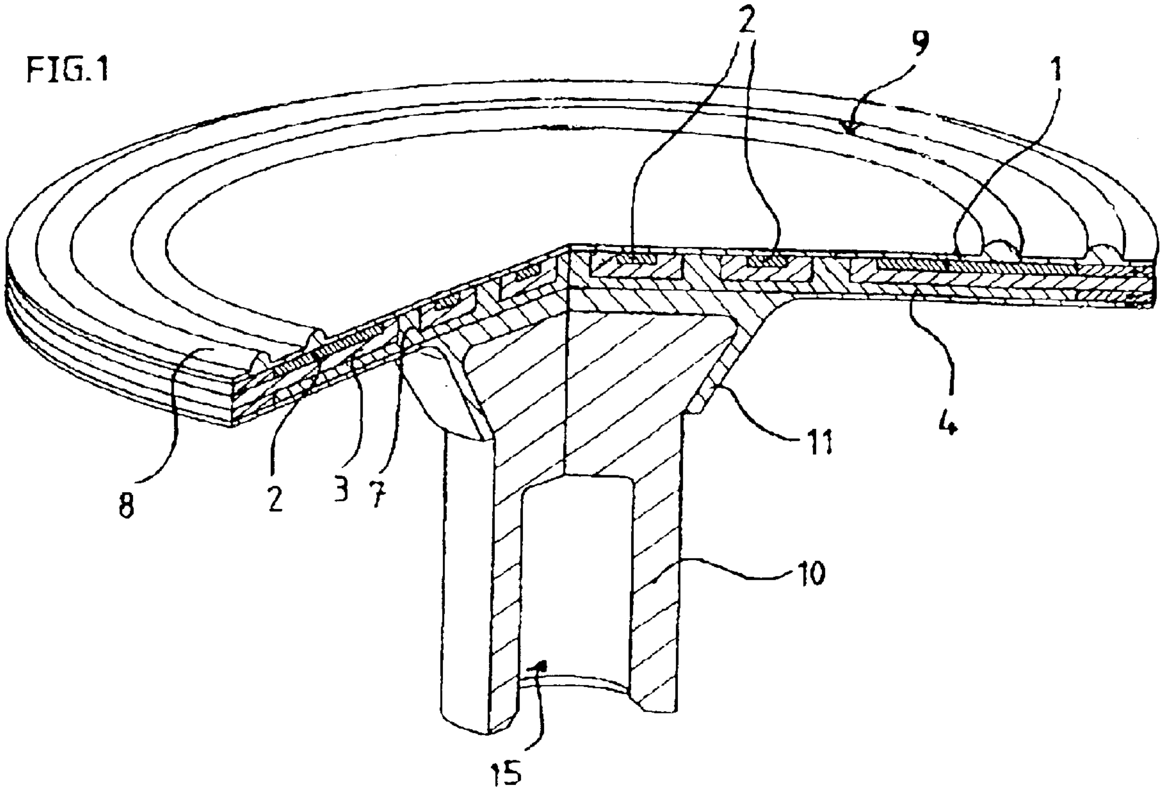

The present invention concerns a sensor diaphragm comprising a plurality of diaphragm layers arranged in sandwich-like mutually superposed relationship, which makes it possible to detect a break in the conveyor diaphragm during operation or in the stopped condition.

Diaphragm pumps are known from the state of the art, in which a flexible diaphragm which closes off a pump volume is rapidly reciprocated in order to draw in a fluid, for example a liquid or a gas, through an inlet valve and, in the next working cycle, to expel it through an outlet valve. Such diaphragm pumps are frequently used for metering chemicals in industrial processing engineering processes. The diaphragms must be inert in relation to aggressive chemicals, for example acids. Therefore the conveyor diaphragm is generally made from a plastic material PTFE (polytetrafluoroethylene) which can be obtained under the mark Teflon. PTFE has the property that it is flexible to a high degree, particularly when it is processed to form thin diaphragm layers. However such plastic diaphragms break with time, at particularly stressed locations. In the case of diaphragms which are used as conveyor diaphragms in pumps, such locations occur in particular in the regions of the conveyor diaphragm, which are adjacent to the clamping regions of the diaphragm and which are subjected to a particular flexing effect during operation. If the conveyor diaphragm suffers from a break the fluid to be conveyed flows into the region of the drive mechanism for the diaphragm where it can result in permanent damage to the pump mechanism for example by virtue of its etching or corrosive effect.

It is therefore desirable for breaks and tears in the conveyor diaphragm to be detected as early as possible so that the diaphragm can be replaced before it has a break entirely therethrough.

So-called sensor diaphragms are known for early detection of breaks in the conveyor diaphragm, the sensor diaphragms producing an electrical warning signal when the conveyor diaphragm begins to tear.

EP 0 715 690 B1 discloses a conveyor diaphragm in which cast into the PTFE layer is a wire loop which covers as large a surface area of the diaphragm as possible. If the diaphragm tears or breaks the wire of the loop also tears and the electrical contact is interrupted. Interruption of that contact is detected by a suitable electronic evaluation system and an alarm signal is triggered. It has been found that this arrangement suffers from the disadvantage that, by virtue of the fact that the wires must be designed to be very thin, they can already tear away due to the mechanical loading involved upon flexing of the diaphragm although no tears have yet occurred in the PTFE material of the conveyor diaphragm.

U.S. Pat. No. 4,569,634 and WO 95/27194 disclose conveyor diaphragms in which the diaphragm has a conductive diaphragm layer below the actual conveyor diaphragm or a conductive diaphragm layer extends through the conveyor diaphragm. The conductive diaphragm layer is connected to the one terminal of a resistance measuring device. The second terminal of the resistance measuring device is connected to the body of the pump volume or to an electrode disposed therein. If now tears or breaks occur in the conveyor diaphragm, the liquid closes the contact between the body and the conductive diaphragm layer in the diaphragm and a warning signal is produced. It has been found that those sensor diaphragms suffer from the disadvantage that the body of the pump volume must comprise a conductive material or a conductive electrode has to be disposed in the pump volume. That limits the area of use of a pump with such a diaphragm to liquids which do not attack the metals as the pump volume cannot be covered entirely with a chemically inert plastic material.

EP 0 732 501 B1 in comparison discloses a sensor diaphragm having two conductive layers within the diaphragm, which are insulated from each other by a further non-conducting layer. In that arrangement all three layers comprise rubber which is mixed with carbon, for the conductive layers. If now the conveyor diaphragm which is arranged over the rubber layers breaks, the liquid or gas to be pumped comes into contact with the first conductive layer. If flow that first conductive layer also breaks and also the insulating rubber layer disposed therebeneath, then the liquid short-circuits the two conductive layers and a warning signal is produced. A serious disadvantage with that configuration of a sensor diaphragm is that breaks in the conveyor diaphragm are only detected when the conductive and insulating diaphragm layers under the conveyor diaphragm, consisting of rubber, are also ruptured therethrough. A diaphragm break is therefore only indicated at a very far advanced time in terms of damage. It is precisely when highly aggressive liquids are involved that liquid can already have penetrated into the drive unit of the pump, at that time.

In comparison with that state of the art, the object of the present invention is to provide a sensor diaphragm which resolves the above-indicated problems.

That object is attained by the sensor diaphragm according to the invention in that it has a plurality of diaphragm layers which are arranged in sandwich-like mutually superposed relationship and which include a conveyor diaphragm, a first electrically conductive diaphragm layer arranged therebeneath, an electrically insulating diaphragm layer arranged therebeneath and a second electrically conductive diaphragm layer arranged therebeneath, wherein the first and second conductive diaphragm layers are separated from each other and electrically insulated by the electrically insulating diaphragm layer and the second electrically conductive diaphragm layer has portions which engage through openings in the electrically insulating diaphragm layer and through openings in the first electrically conductive diaphragm layer and the electrically insulating diaphragm layer has portions which engage through openings in the first conductive diaphragm layer.

The way in which the object of the invention is achieved in accordance with the invention is particularly advantageous as a break in the conveyor diaphragm is detected as soon as liquid has passed the conveyor diaphragm and has advanced as far as the plane of the first conductive diaphragm layer. The material of the second diaphragm layer, which engages through the openings, also extends as far as that plane, that is to say above the first conductive diaphragm layer. In the normal condition, that is to say the intact condition, the materials of the first and second conductive diaphragm layers however are electrically insulated from each other by the material of the insulating diaphragm layer which also engages through the openings in the first conductive diaphragm layer. It is only when the liquid penetrates and wetting with liquid takes place in the region of the through openings, that a measurable electrically conductive connection is produced between the first conductive diaphragm layer and the second conductive diaphragm layer by way of the liquid. There is in contrast no need for the diaphragm layers which are disposed under the conveyor diaphragm to be broken open, for the purposes of triggering the signal.

A preferred embodiment of the invention is one in which the conveyor diaphragm is made from a flexible, chemically inert plastic material, preferably polytetrafluoroethylene (PTFE). Such a configuration has the advantage that the diaphragm is not attacked by lost chemicals to be conveyed.

It is desirable if the electrically conductive and electrically insulating diaphragm layers are made from rubber, preferably a EPDM (ethylene-propylene terpolymer) reinforced with plastic fibres. Such a rubber has the advantage that it is highly flexible, pressure-resistant and can bear very high loadings. That applies precisely in regard to the flexing movements which occur in respect of the diaphragms in diaphragm pumps. If the rubber is mixed with a suitable amount of carbon particles, it becomes conductive, in which case the positive properties of the rubber are fully retained or are retained at least to an adequate degree.

It has proven to be advantageous if the portions of the second electrically conductive layer passing through the first electrically conductive diaphragm layer and the insulating diaphragm layer are arranged in the proximity of the diaphragm regions which are flexed in the diaphragm stroke movement. They are disposed in particular in the region around the clamping region of the diaphragm and in the regions surrounding the diaphragm core. They are particularly heavily loaded in the stroke movements of the diaphragm. Therefore breaks and tears occur in the conveyor diaphragm firstly at those locations so that it is to be expected that it is at those locations that liquid firstly reaches the diaphragm layers under the conveyor diaphragm. If the through portions are arranged in that region, an alarm signal is triggered directly when the liquid passes through.

A preferred embodiment of the invention is one in which the diaphragm is substantially in the shape of a circular disc. By virtue of the symmetry, the loadings due to the flexing movements then occur distributed uniformly over the periphery of the diaphragm. It is advantageous if the diaphragm layers are of substantially the same diameter. That ensures that, for example upon tearing of the conveyor diaphragm liquid does not go past the subjacent diaphragm layers into the region of the pump drive.

A particularly preferred embodiment of the invention is one in which the through portions through the first electrically conductive diaphragm layer are of a circular, oval or square shape, in which respect circular through portions are particularly preferred for stability reasons. In a further preferred embodiment at least some of the through portions are openings arranged in a kidney shape around the centre point of the diaphragm. By virtue of that design configuration, it is possible to arrange many possible contact bridges which can detect a break in the conveyor diaphragm, on the periphery of the diaphragm. By virtue of the diaphragm being in the shape of a circular disc, it is advantageous if the through portions are arranged symmetrically around the centre point of the diaphragm. In addition it may be advantageous if a through portion is arranged at the centre point of the diaphragm. In that way all regions of the conveyor diaphragm, which are particularly loaded by flexing, can be monitored for tears and breaks.

In that respect, a desirable embodiment of the invention is one in which preferably between 4 and 20 through portions are arranged symmetrically in concentric circles around the centre point of the diaphragm. For the typical diameters of the conveyor diaphragms, that permits good area coverage by the possible contact bridges between the first and the second conductive diaphragm layers. In that way the regions of the diaphragm, which are particularly heavily flexed, near the clamping region, can be monitored particularly well and over the length of the entire periphery.

As an alternative thereto the through portions can be arranged in the form of concentric circles around the centre point of the diaphragm. That makes it possible to monitor the sealing integrity of the conveyor diaphragm over the length of the entire periphery in the region of greatest loading.

A preferred embodiment of the invention is one in which the conveyor diaphragm has one or more scaling ridges arranged concentrically around the centre point of the diaphragm. In that case, they are arranged in the region of the clamping region of the diaphragm so that here they form an effective seal between the conveyor diaphragm and the housing delimiting the pump volume. As the conveyor diaphragm does not have to be further sealed off, it can be replaced easily, without using additional sealing means.

A particularly advantageous embodiment of the invention is one in which the diaphragm has a diaphragm core of plastic material or metal or combinations thereof, which is arranged beneath the second conductive diaphragm layer symmetrically with respect to the centre point of the diaphragm. It forms the mechanical connection between the individual diaphragm layers and the mechanism for driving the diaphragm.

It is found to be desirable if arranged beneath the second conductive diaphragm layer, that is to say between that and the diaphragm core, there is a further insulating diaphragm layer. It provides electrical insulation between the second conductive diaphragm layer and the diaphragm core. It can also be positively lockingly connected to the diaphragm core so that it transmits the movements of the core directly to the diaphragm.

It has proven to be advantageous in regard to the present invention if the individual layers of the diaphragm are non-separably connected together for example by vulcanisation or glueing. In that way the stroke movement is transmitted in optimum fashion to all layers and in particular to the conveyor diaphragm.

A particularly preferred embodiment of the invention is one in which the two electrically conductive diaphragm layers are connected to the two terminals of a resistance, current or voltage measuring device. In that way bridging of the insulation between the two electrically conductive diaphragm layers by the liquid to be pumped can he easily detected on the basis of a change in resistance and an alarm signal can possibly be produced.

The conductive diaphragm layers, as stated above, are preferably made from rubber to which carbon particles are added for conductivity. The conductivity of those mixtures however is not comparable to that of metallic conductors, but is some orders of magnitude lower. The resistances to he measured when contact occurs between the first and second conductive diaphragm layer are therefore usually in the mega-ohm range. It is desirable if the conductive diaphragm layers are contacted by means of metallic contact pins from the side in opposite relationship to the liquid to be pumped. In that respect care must be taken to ensure that the pin contacting the first conductive diaphragm layer engages through the second electrically conductive diaphragm layer and the electrically insulating diaphragm layer, wherein it is insulated in the region of the second electrically conductive diaphragm layer by material of the insulating diaphragm layer with respect to the second electrically conductive diaphragm layer or another insulating material. Such a configuration makes it possible for the diaphragm to be easily replaced as it is possible to mount to the contact pins a simple plug connection which connects the diaphragm to the appropriate electronic measuring system.

It is advantageous if the above-described sensor diaphragm is used in a diaphragm pump.

Figure 2:
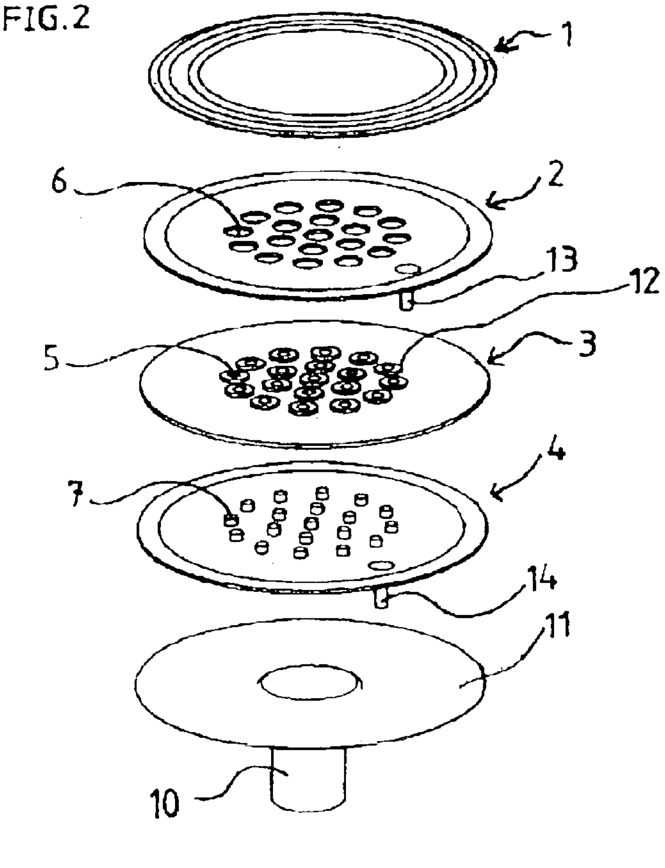
Figure 3:
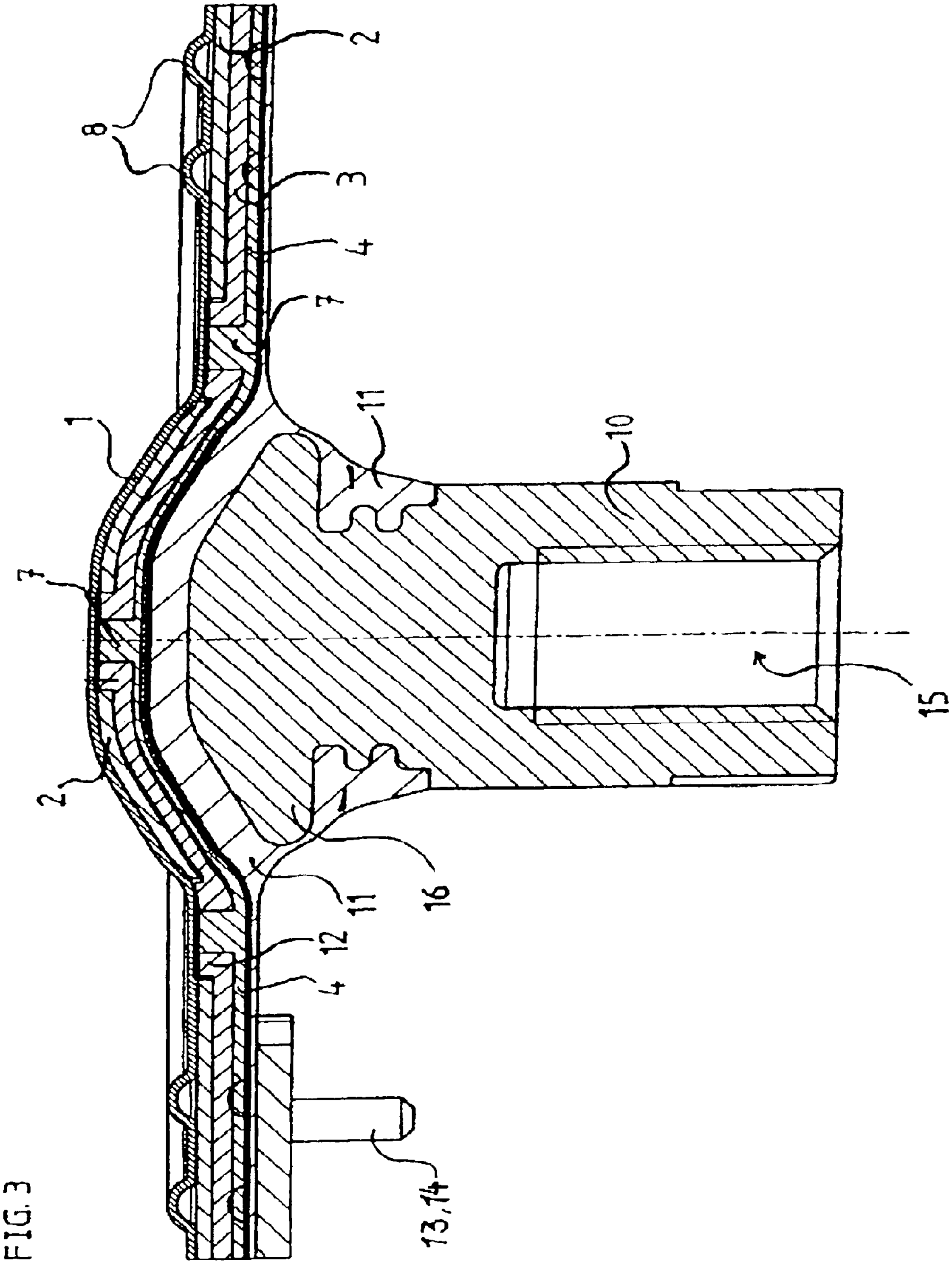

Further features, advantages and embodiments of the present invention will be apparent from the accompanying Figures and the related drawing. In the Figures:

FIG. 1 is a three-dimensional broken-away view of the sensor diaphragm according to the invention, FIG. 2 shows an exploded view of the sensor diaphragm according to the invention, and FIG. 3 is a view in section through an alternative embodiment of the sensor diaphragm according to the invention.

FIG. 1 clearly shows the diagrammatic structure of a preferred embodiment of the sensor diaphragm according to the invention. The conveyor diaphragm 1 forms the uppermost layer of the sensor diaphragm. In the illustrated embodiment it comprises PTFE. In the outer regions of the diaphragm it is possible to clearly see two sealing ridges 8 which protrude from the conveyor diaphragm 1. The two sealing ridges 8 are disposed in what is to referred to as the clamping region 9 of the diaphragm. That region is clamped under pressure in the clamping holding means, provided for that purpose, of the diaphragm pump. In that case the sealing ridges 8 seal off the diaphragm against the holding means thereof so that no liquid can escape from the working chamber. The first conductive diaphragm layer 2 is arranged below the conveyor diaphragm 1. The diaphragm layer 2 comprises rubber which is enriched with plastic fibres to enhance stability and which additionally contains carbon particles in an amount such that the rubber diaphragm is conductive. The first conductive diaphragm layer 2 forms a continuous body which is produced as one part. That can be particularly clearly seen in the exploded view in FIG. 2. Therein the individual layers of the sensor diaphragm according to the invention are shown prior to assembly.

The first conductive diaphragm layer 2 has openings 6. Arranged beneath the first conductive diaphragm layer 2 is the insulating diaphragm layer 3, also made from rubber with plastic fibres. It has regions 12 which extend upwardly beyond the plane formed by the diaphragm layer 3 and engage through the openings 6 of the first conductive diaphragm layer 2.

Arranged beneath the insulating diaphragm layer 3 is the second electrically conductive diaphragm layer 4. It has regions 7 which project out of the plane formed by the diaphragm layer 4 and engage through the openings 5 in the insulating diaphragm layer 3 into the openings 6 of the first conductive diaphragm layer 2. In that case they are surrounded by the regions 12 of the insulating diaphragm layer 3, which also engage into the openings 6 of the first conductive diaphragm layer 2, and are thus electrically insulated from the first conductive diaphragm layer 2.

It can be seen from FIG. 2 that the described embodiment has a total of 19 portions of the second conductive diaphragm 4 which engage into the first electrically conductive diaphragm. They are distributed in the following: at the centre of the diaphragm there is a central through portion which is surrounded by a first concentric circle of 6 through portions, and a further concentric circle with 12 through portions. That arrangement permits optimum coverage of the surface area of the diaphragm with possible contact bridges, in particular in the regions which are most heavily flexed.

FIG. 3 shows an alternative embodiment of the diaphragm in FIGS. 1 and 2 with a somewhat different number and arrangement of the through-engagement openings. Otherwise the structure is the same, for which reason the same parts are denoted by the same references.

As can be particularly clearly seen from FIG. 2, disposed beneath the second electrically conductive diaphragm layer 4 is a further insulating diaphragm layer 11 which is made from the same rubber material as the insulating diaphragm layer 3.

The individual layers of the diaphragm are connected together by vulcanisation or glueing so that mechanically they form one unit.

Arranged beneath the diaphragm layer 11 is a diaphragm core 10 of metal or plastic material. It substantially comprises a cylindrical rod which at the lower end has a receiving means 15 into which the connecting rod of the drive unit engages. The diaphragm core 10 transmits the translation movement of the drive unit to the layers of the sensor diaphragm, which are above the diaphragm core 10. For effective transmission of the movement to the diaphragm layers the lowermost insulating diaphragm layer 11 is such that it engages in positively locking relationship into the head 16 of the diaphragm core 10. In that way the translatory movement of the diaphragm core 10 is transmitted both in the lift and also in the suction direction to the diaphragm layers (1, 2, 3, 4, 11) arranged over the core 10. That can also be particularly clearly seen from FIG. 3.

Electrical contacting of the electrically conductive diaphragm layers 2, 4 is effected by means of metal pins 13 and 14 which engage through the lowermost insulating diaphragm layer 11 into the corresponding electrically conductive diaphragm layers. In that respect care is to be taken to ensure that the pin 13 which contacts the first electrically conductive diaphragm layer 2 is insulated by means of the material of the insulating diaphragm layer 3 or by another material with respect to the second electrically conductive diaphragm layer 4.

In this embodiment of the invention the pins 13 and 14 are connected to the two terminals of a resistance measuring device. The electrical resistance between the two electrically conductive diaphragms 2, 4 is measured. If the conveyor diaphragm 1 is intact, that is to say if it does not have any breaks or tears extending therethrough, the surface of the diaphragm layers under the conveyor diaphragm 1 is not wetted by the liquid and the resistance between the first and second electrically conductive layers (2, 4) is extremely great. In a damage situation, that is to say if through tears or breaks occur in the conveyor diaphragm 1, the liquid to be conveyed passes through the conveyor diaphragm 1 and wets the surface of the diaphragm layers under the conveyor diaphragm 1 so that the electrical resistance between the first 2 and second 2 electrically conductive diaphragm layers decreases, that is to say it goes into the region of 50 MΩ and less. Such a drop in electrical resistance can be detected by the resistance measuring device and triggers off an alarm, when the value thereof falls below a preset threshold value.

The sensor diaphragm can be replaced immediately after the alarm indicating lack of scaling integrity has occurred or after a predetermined time interval. By virtue of the configuration of its mechanical and electrical connections, replacement of the diaphragm is extremely simple and can also be performed by semi-skilled assistants. The edge regions of the diaphragm are clamped in a holding means provided for that purpose and are automatically sealed after the clamping operation, by virtue of the provided sealing ridges 8. Connection of the diaphragm core 10 to the coupling rod of the drive unit, for example a motor with an eccentric drive or an electromechanical linear drive, is effected by means of the connection 15 in the lower region of the core 10. The electrical connection to the pins 13 and 14 is effected by means of a standardised plug element.

What we claim is:

1. A sensor diaphragm comprising a plurality of diaphragm layers which are arranged in a mutually superposed relationship and which include a conveyor diaphragm (1), a first electrically conductive diaphragm layer (2) arranged therebeneath, an electrically insulating diaphragm layer (3) arranged therebeneath and a second electrically conductive diaphragm layer (4) arranged therebeneath, wherein the first and second conductive diaphragm layers (2, 4) are separated from each other and electrically insulated by the electrically insulating diaphragm layer (3) and the second electrically conductive diaphragm layer (4) has through portions (7) which engage through openings (5) in the electrically insulating diaphragm layer (3) and through openings (6) in the first electrically conductive diaphragm layer (2) and the electrically insulating diaphragm layer (3) has portions (12) which engage through the openings (5) in the first conductive diaphragm layer.

2. A sensor diaphragm according to claim 1 wherein the conveyor diaphragm (1) is made from a flexible, chemically inert plastic material.

3. A sensor diaphragm according to claim 2 wherein the plastic material is polytetrafluoroethylene (PTFE).

4. A sensor diaphragm according to claim 1 wherein the electrically conductive (2, 4) and electrically insulating (3) diaphragm layers comprise a rubber material.

5. A sensor diaphragm according to claim 2 wherein the electrically conductive (2, 4) and electrically insulating (3) diaphragm layers comprise a rubber material.

6. The sensor diaphragm of claim 4 wherein the rubber material is an EPDM (ethylene-propylene terpolymer reinforced with plastic fibers.

7. A sensor diaphragm according to claim 4 wherein the electrically conductive diaphragm layers (2, 4) of rubber include an admixture of carbon particles in an amount such that the diaphragm layers are electrically conductive.

8. A sensor diaphragm according to claim 5 wherein the electrically conductive diaphragm layers (2, 4) of rubber include an admixture of carbon particles in an amount such that the diaphragm layers are electrically conductive.

9. A sensor diaphragm according to claim 6 wherein the electrically conductive diaphragm layers (2, 4) of rubber include an admixture of carbon particles in an amount such that the diaphragm layers are electrically conductive.

10. A sensor diaphragm according to claim 1 wherein the through portions are arranged in a proximity of diaphragm regions which are flexed in a diaphragm stroke movement.

11. A sensor diaphragm according to claim 4 wherein the through portions are arranged in a proximity of diaphragm regions which are flexed in a diaphragm stroke movement.

12. A sensor diaphragm according to claim 1 wherein the diaphragm is substantially in the shape of a circular disc.

13. A sensor diaphragm according to claim 1 wherein the diaphragm layers are of substantially the same diameter.

14. A sensor diaphragm according to claim 1 wherein the through portions through the first electrically conductive diaphragm layer (2) are of a circular, circular segment-shaped, kidney-shaped, square or oval form.

15. A sensor diaphragm according to claim 4 wherein the through portions through the first electrically conductive diaphragm layer (2) are of a circular, circular segment-shaped, kidney-shaped, square or oval form.

16. A sensor diaphragm according to claim 1 wherein the through portions are arranged symmetrically around the center point of the diaphragm.

17. A sensor diaphragm according to claim 1 wherein a through portion is arranged at the center point of the diaphragm.

18. A sensor diaphragm according to claim 4 wherein a through portion is arranged at the center point of the diaphragm.

19. A sensor diaphragm according to claim 10 wherein a through portion is arranged at the center point of the diaphragm.

20. A sensor diaphragm according to claim 1 wherein between 4 and 20 through portions are arranged symmetrically around a center point of the diaphragm.

21. A sensor diaphragm according to claim 1 wherein the through portions through the first electrically conductive diaphragm layer (2) form concentric circles around a center point of the diaphragm.

22. A sensor diaphragm according to claim 1 wherein the conveyor diaphragm (1) has at least one sealing ridge (8) which extends concentrically around a center point of the diaphragm and which is arranged in a clamping region (9) of the diaphragm.

23. A sensor diaphragm according to claim 1 wherein the diaphragm has a diaphragm core (10) which is arranged beneath the second conductive diaphragm layer (4) symmetrically with respect to a center point of the diaphragm.

24. A sensor diaphragm according to claim 1 wherein the sensor diaphragm has a further electrically insulating diaphragm layer (11) of rubber between the second conductive diaphragm layer (4) and the diaphragm core (10), which is positively connected to the diaphragm core (10).

25. A sensor diaphragm according to claim 24 wherein layers (1, 2, 3, 4, 11) of the diaphragm are sealed together.

26. A sensor diaphragm according to claim 1 wherein the electrically conductive diaphragm layers (2, 4) are connected to two terminals of an electrical measuring device.

27. A sensor diaphragm according to claim 1 wherein the conductive diaphragm layers (2, 4) are contacted by means of metallic contact pins (13, 14), wherein the pin (13) contacts the first conductive diaphragm layer (2) and engages through the second conductive diaphragm layer (4) and through the insulating diaphragm layer (3) and is insulated from the second conductive diaphragm layer (4).

28. The sensor diaphragm of claim 27 wherein pin 13 is insulated from second diaphragm layer (4) with material of insulating diaphragm layer (3).

29. A diaphragm pump comprising a sensor diaphragm according to claim 1.

* * * * *